United States Patent Office 3,252,984
Patented May 24, 1966

3,252,984
ESTERS OF XANTHENYLPIPERIDINECARBOXYLIC ACID AND RELATED COMPOUNDS
John W. Cusic, Skokie, and Peter Yonan, Chicago, Ill., assignors to G. D. Searle & Co., Chicago, Ill., a corporation of Delaware
No Drawing. Filed Apr. 21, 1964, Ser. No. 361,538
6 Claims. (Cl. 260—293.4)

The present invention relates to a group of compounds which are esters of xanthenylpiperidinecarboxylic acids. More particularly, the present invention relates to a group of compounds having the following general formula

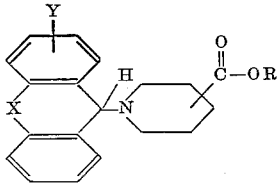

wherein X is selected from the group consisting of O and S; Y is selected from the group consisting of hydrogen, halogen, and methyl; and R is a lower alkyl radical. The halogens referred to above include fluorine, chlorine, bromine, and iodine. The lower alkyl radicals referred to above contain up to 6 carbon atoms and are exemplified by radicals such as methyl, ethyl, propyl, isopropyl, and butyl.

The compounds of the present invention are conveniently prepared by the reaction of a xanthydrol or thioxanthydrol with a piperidinecarboxylic acid ester. The reaction is conveniently carried out at reflux in an inert solvent in the presence of a weak acid. Toluene is a particularly useful solvent although benzene and xylene are examples of other solvents which can be used for this purpose. A weak acid such as acetic acid can be used to catalyze the reaction. In addition, it is useful to carry out the reaction in an apparatus equipped with a water trap so that water can be removed from the reaction mixture as it is formed.

The compounds of the present invention possess valuable pharmacological properties. Thus, the present compounds are useful as pepsin inhibitors and anti-ulcer agents. The anti-ulcer activity of these compounds is demonstrated by their inhibition of ulceration in the Shay rat. The present compounds also possess anti-atherogenic activity which is demonstrated by their inhibition of hepatic synthesis of cholesterol.

The organic bases of this invention form pharmaceutically acceptable, non-toxic, acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The following examples are presented to further illustrate the present invention; they should not be construed as limiting it in spirit or in scope. In these examples, quantities are indicated in parts by weight and temperatures in degrees centigrade (° C.).

*Example 1*

To a solution of 15 parts of xanthydrol and 12 parts of methyl piperidine-4-carboxylate in 155 parts of toluene is added 8 parts of glacial acetic acid. The resultant mixture is refluxed for 16 hours in an apparatus equipped with a water trap. The solvent is evaporated from the resultant solution at reduced pressure and the residue is dissolved in ether. The ether solution is then washed with water and dried and the solvent is evaporated to give an oil which solidifies when triturated with hexane. The resultant solid is then recrystallized from hexane to give methyl 1-(9-xanthenyl)piperidine-4-carboxylate melting at about 91–92° C. This compound has the following formula

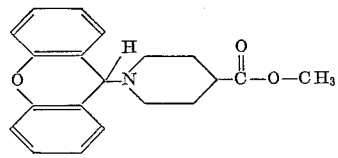

*Example 2*

A solution is prepared from 10 parts of xanthydrol, 12 parts of ethyl piperidine-4-carboxylate and 140 parts of toluene. 10 parts of gacial acetic acid is added to this solution which is then refluxed for 16 hours in an apparatus equipped with a water trap. The solvent is then evaporated from the reaction mixture under reduced pressure and the residue is dissolved in ether. The ether solution is washed with water and dried and the solvent is evaporated to leave a residual crude solid. The solid is recrystallized twice from ethanol to give ethyl 1-(9-xanthenyl)piperidine - 4 - carboxylate melting at about 86–87° C.

*Example 3*

If an equivalent quantity of 2-chloroxanthydrol is substituted for the xanthydrol and the procedure of Example 2 is repeated, the product obtained is ethyl 1-(2-chloro-9-xanthenyl)piperidine-4-carboxylate. This compound has the following formula

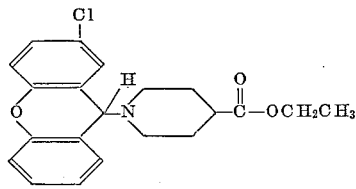

*Example 4*

If an equivalent quantity of ethyl piperidine-3-carboxylate is substituted for the ethyl piperidine-4-carboxylate and the procedure of Example 2 is repeated, the product obtained is ethyl 1-(9-xanthenyl)piperidine-3-carboxylate. This compound has the following formula

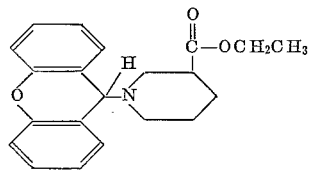

*Example 5*

15 parts of thioxanthydrol and 10 parts of methyl piperidine-4-carboxylate are dissolved in 155 parts of toluene and 5 parts of glacial acetic acid is added. The resultant mixture is refluxed for 4 hours in an apparatus equipped with a water trap. The solvent is evaporated from the resultant reaction mixture and the residue is dissolved in ether. The ether solution is filtered, concentrated, and cooled to give a crystalline product. This is recrystallized from hexane to give methyl 1-(9-thioxanthenyl)piperidine - 4 - carboxylate melting at about 133–134° C.

If ethyl piperidine-4-carboxylate is reacted with thioxanthydrol according to the procedure described in the preceding paragraph the product obtained is ethyl 1-(9- thioxanthenyl)piperidine-4-carboxylate. This compound has the following formula

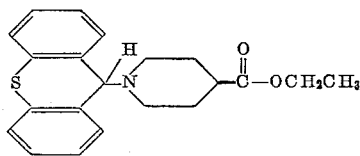

What is claimed is:
1. A compound of the formula

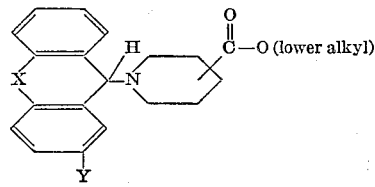

wherein X is selected from the group consisting of O and S; and Y is selected from the group consisting of hydrogen and chlorine.

2. A compound of the formula

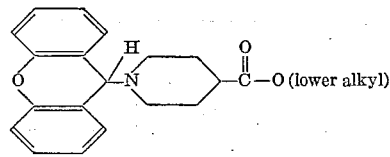

3. Methyl 1-(9-xanthenyl)piperidine-4-carboxylate.
4. Ethyl 1-(9-xanthenyl)piperidine-4-carboxylate).
5. A compound of the formula

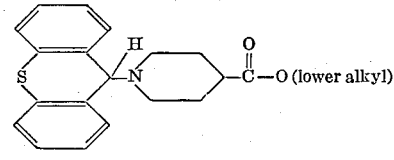

6. Methyl 1-(9-thioxanthenyl)piperidine-4-carboxylate.

No references cited.

WALTER A. MODANCE, *Primary Examiner.*